US 12,444,570 B2

(12) United States Patent
Jing et al.

(10) Patent No.: US 12,444,570 B2
(45) Date of Patent: Oct. 14, 2025

(54) ELECTROSTATIC CHUCK HEATER RESISTANCE MEASUREMENT TO APPROXIMATE TEMPERATURE

(71) Applicant: Lam Research Corporation, Fremont, CA (US)

(72) Inventors: Changyou Jing, Livermore, CA (US); Oleksandr Mikhnenko, San Diego, CA (US); Christopher Kimball, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 617 days.

(21) Appl. No.: 17/437,401

(22) PCT Filed: Mar. 10, 2020

(86) PCT No.: PCT/US2020/021836
§ 371 (c)(1),
(2) Date: Sep. 8, 2021

(87) PCT Pub. No.: WO2020/185744
PCT Pub. Date: Sep. 17, 2020

(65) Prior Publication Data
US 2022/0172925 A1    Jun. 2, 2022

(51) Int. Cl.
*H01J 37/32* (2006.01)

(52) U.S. Cl.
CPC .. *H01J 37/32082* (2013.01); *H01J 37/32266* (2013.01); *H01J 37/32522* (2013.01); *H01J 2237/2007* (2013.01)

(58) Field of Classification Search
CPC ... G01R 19/10; G01R 27/08; H01J 37/32082; H01J 37/32266; H01J 37/32522;
(Continued)

(56) References Cited

U.S. PATENT DOCUMENTS 4,901,257 A * 2/1990 Chang .................. G05D 23/24
324/714
6,767,752 B2   7/2004 Nakano et al.
(Continued)

FOREIGN PATENT DOCUMENTS

JP    H10-116885 A   5/1998
WO   WO 02-09162 A2  1/2002

OTHER PUBLICATIONS

ISR & Written Opinion PCT/US2020/021836, dated Mar. 10, 2020, 14 pages.
(Continued)

*Primary Examiner* — Lee E Rodak
*Assistant Examiner* — Demetrius R Pretlow
(74) *Attorney, Agent, or Firm* — PENILLA IP, APC

(57) ABSTRACT

A controller including a voltage sensor coupled to a heater trace integrated in an electrostatic chuck, the voltage sensor configured to sense a voltage difference across the heater trace, wherein the heater trace is associated with a heater zone. The controller including a current sensor coupled to the heater trace and configured to sense a current in the heater trace. The controller including a resistance identifier configured to identify a resistance of the heater trace based on the voltage difference and the current that is sensed. The controller including a temperature correlator configured to approximate a temperature of the heater zone based on the resistance and a correlation function of the heater trace. The correlation function uses a temperature coefficient of resistance of the heater trace.

27 Claims, 7 Drawing Sheets

(58) Field of Classification Search
CPC ....... H01J 2237/2007; H01L 21/67103; H01L 21/67248; H01L 21/6831
See application file for complete search history.

(56) References Cited

U.S. PATENT DOCUMENTS

| | | | | |
|---|---|---|---|---|
| 7,196,295 | B2* | 3/2007 | Fennewald | H05B 1/023 |
| | | | | 219/241 |
| 8,378,272 | B2* | 2/2013 | Shigetomi | H01L 21/67248 |
| | | | | 219/486 |
| 9,775,194 | B2 | 9/2017 | Pease et al. | |
| 2004/0104336 | A1 | 6/2004 | Melnyk et al. | |
| 2005/0225923 | A1* | 10/2005 | Howald | H01J 37/32082 |
| | | | | 361/234 |
| 2005/0228596 | A1* | 10/2005 | Shoji | G01N 27/18 |
| | | | | 702/24 |
| 2012/0292305 | A1* | 11/2012 | Ambal | G05D 23/22 |
| | | | | 219/520 |
| 2013/0020311 | A1 | 1/2013 | Sakagami et al. | |
| 2014/0251214 | A1* | 9/2014 | Cuvalci | H01L 21/67103 |
| | | | | 118/712 |
| 2015/0203297 | A1* | 7/2015 | Manning | B65G 1/137 |
| | | | | 700/218 |
| 2016/0049323 | A1* | 2/2016 | Ye | H01L 21/6833 |
| | | | | 361/234 |
| 2017/0018401 | A1* | 1/2017 | Rudolph | H01J 37/32522 |
| 2017/0098564 | A1 | 4/2017 | Pape et al. | |
| 2017/0236733 | A1* | 8/2017 | Leeser | C23C 16/4557 |
| | | | | 118/712 |
| 2017/0363663 | A1* | 12/2017 | Breitlow | F24D 11/0207 |
| 2018/0053636 | A1* | 2/2018 | Criminale | H01L 22/20 |
| 2018/0053666 | A1* | 2/2018 | Babayan | H01L 21/67248 |
| 2018/0088066 | A1* | 3/2018 | Schmidt | H05B 3/28 |
| 2018/0124870 | A1* | 5/2018 | Ohse | H05B 3/0014 |
| 2018/0210473 | A1* | 7/2018 | Zhang | H01L 21/67103 |
| 2019/0148190 | A1 | 5/2019 | Pape et al. | |
| 2019/0371634 | A1* | 12/2019 | Yamada | H01L 21/3065 |
| 2020/0030807 | A1* | 1/2020 | Ebert | G01N 25/00 |
| 2020/0177825 | A1* | 6/2020 | Kitayama | G01J 5/53 |
| 2020/0256899 | A1* | 8/2020 | Breitlow | G01R 19/225 |
| 2020/0389939 | A1* | 12/2020 | Yender | H05B 3/26 |
| 2021/0249284 | A1* | 8/2021 | Prasad | C23C 16/46 |
| 2021/0263542 | A1* | 8/2021 | Breitlow | G05D 23/1934 |
| 2021/0368584 | A1* | 11/2021 | Breitlow | H05B 1/0227 |

OTHER PUBLICATIONS

TW Application No. 109108138, Office Action dated Aug. 11, 2023, Total 9 pages.

* cited by examiner

400

- Supplying power to a heater trace integrated in a heater zone of an electrostatic chuck (ESC) for a plasma processing chamber, the heater trace configured to provide heat to the heater zone — 410
- Sensing a voltage difference between an input end and an output end of the heater trace — 420
- Sensing a current in the heater trace — 430
- Identifying a resistance of the heater trace based on the sensed voltage difference and the sensed current — 440
- Approximating a temperature of the heater zone based on the identified resistance and a correlation function of the heater trace without using a temperature sensor in the heater zone of the ESC — 450

ELECTROSTATIC CHUCK HEATER RESISTANCE MEASUREMENT TO APPROXIMATE TEMPERATURE

CLAIM OF PRIORITY

This application is a national stage filing of and claims priority, under 35 U.S.C. § 371, to PCT/US2020/021836, filed on Mar. 10, 2020, and titled "ELECTROSTATIC CHUCK HEATER RESISTANCE MEASUREMENT TO APPROXIMATE TEMPERATURE", which is incorporated by reference herein in its entirety.

TECHNICAL FIELD

The present embodiments relate to an electrostatic chuck (ESC) useful for processing substrates such as semiconductor wafers. The ESC can be used to support a semiconductor substrate in a plasma reaction chamber wherein etching or deposition processes are carried out. In particular, the present embodiments relate to measurement of resistance of a heater trace within a heater zone of an ESC to approximate a temperature of the heater zone without using a temperature sensor in the heater zone of the ESC.

BACKGROUND OF THE DISCLOSURE

Many modern semiconductor fabrication processes are performed in plasma process modules in which a substrate is held on a substrate holder when exposed to a plasma. Temperature control of the substrate during plasma processing operations is one factor that can influence the outcome of the processing operations. To provide for control of the substrate temperature during the plasma processing operation, it is necessary to accurately and reliably measure the temperature of the substrate holder so as to infer the temperature of the substrate held thereon.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure It is in this context that embodiments of the disclosure arise.

SUMMARY

The present embodiments relate to solving one or more problems found in the related art, and specifically to include an electrostatic chuck for a plasma processing chamber, wherein the ESC includes a heater trace in a heater zone of the ESC, wherein the heater trace is configured for sensing temperature through a determined resistance of the heater trace. Several inventive embodiments of the present disclosure are described below.

Embodiments of the present disclosure include a controller including a voltage sensor coupled to a heater trace integrated in an electrostatic chuck, the voltage sensor configured to sense a voltage difference across the heater trace, wherein the heater trace is associated with a heater zone. The controller including a current sensor coupled to the heater trace and configured to sense a current in the heater trace. The controller including a resistance identifier configured to identify a resistance of the heater trace based on the voltage difference and the current that is sensed. The controller including a temperature correlator configured to approximate a temperature of the heater zone based on the resistance and a correlation function of the heater trace. The correlation function uses a temperature coefficient of resistance of the heater trace.

Other embodiments of the present disclosure include a user interface configured to provide information to a user. The user interface may be provided within a display that is outside of a plasma processing chamber. The display is configured to show information related to a first heater zone of an electrostatic chuck for a plasma processing chamber. The information includes a first temperature associated with the first heater zone. The first temperature is determined by a first temperature controller that is configured to sense a voltage difference across a first heater trace associated with the first heater zone. The first temperature controller is configured to sense a current in the first heater trace. The first temperature controller is configured to identify a resistance of the first heater trace based on the voltage difference and the current that is sensed. The first temperature controller is configured to approximate the first temperature based on the resistance and a correlation function of the first heater trace.

The user interface may include an alert providing a recommendation including at least one action to be taken based on the information. In particular, the first temperature is determined by a first temperature controller that is configured to sense a voltage difference across a first heater trace integrated in the first heater zone; to sense a current in the first heater trace; to identify a resistance of the first heater trace based on the voltage difference and the current that is sensed; and to approximate the first temperature based on the resistance and a correlation function of the first heater trace.

Embodiments of the present disclosure include an electrostatic chuck (ESC) for a plasma processing chamber, wherein the ESC is configured to support a substrate during processing. The ESC includes a first heater zone. The ESC includes a first heater trace integrated in the heater zone and configured to provide heat to the first heater zone. The first heater trace having a first input end and a first output end. A first temperature controller is configured to approximate a temperature in the first heater zone. The temperature controller being configured to sense a first voltage difference across the first heater trace and sense a first current in the first heater trace. The first temperature controller is configured to identify a first resistance of the first heater trace based on the sensed first voltage difference and the sensed first current. The first temperature controller is configured to approximate a first temperature of the first heater zone based on the identified first resistance and a first correlation function of the first heater trace, wherein the first correlation function uses a first temperature coefficient of resistance of the first heater trace.

Other embodiments of the present disclosure include a method for controlling temperature of an electrostatic chuck (ESC) in a plasma processing chamber, the ESC having a heater zone with a heater trace integrated therein. The heater trace having an input end and an output end and is configured to provide heat to the heater zone. The method includes supplying power to the heater trace. The method includes sensing a voltage difference across the heater trace (e.g., between the input end and the output end of the heater trace). The method includes sensing a current in the heater trace. The method includes identifying a resistance of the heater trace based on the sensed voltage difference and the sensed current. The method includes approximating a temperature of the heater zone based on the identified resistance and a correlation function of the heater trace without using a temperature sensor in the heater zone, wherein the correlation function uses a temperature coefficient of resistance of the heater trace.

Still other embodiments of the present disclosure include a plasma processing system for processing a substrate. The plasma processing system includes a reactor including an electrostatic chuck (ESC) for supporting the substrate, wherein the reactor is configured to receive process gases. The ESC includes a heater zone. The ESC further includes a heater trace integrated in the heater zone. The heater trace is configured to provide heat to the heater zone, and includes an input end and an output end. The plasma processing system includes a temperature controller coupled configured to sense a voltage difference between the input end and the output end of the heater trace and sense a current in the heater trace. The temperature controller is configured to identify a resistance of the heater trace based on the sensed voltage difference and the sensed current. The temperature controller is configured to approximate a temperature of the heater zone based on the identified resistance and a correlation function of the heater trace, wherein the correlation function uses a temperature coefficient of resistance of the heater trace.

These and other advantages will be appreciated by those skilled in the art upon reading the entire specification and the claims.

BRIEF DESCRIPTION OF THE DRAWINGS

The embodiments may best be understood by reference to the following description taken in conjunction with the accompanying drawings.

FIG. 4 is a flow diagram illustrating a method for measuring temperature of a temperature zone of an electrostatic chuck using a corresponding heater trace which is configured for temperature sensing and for providing heat to the heater zone, in accordance with one embodiment of the present disclosure.

DETAILED DESCRIPTION

Figure 1:
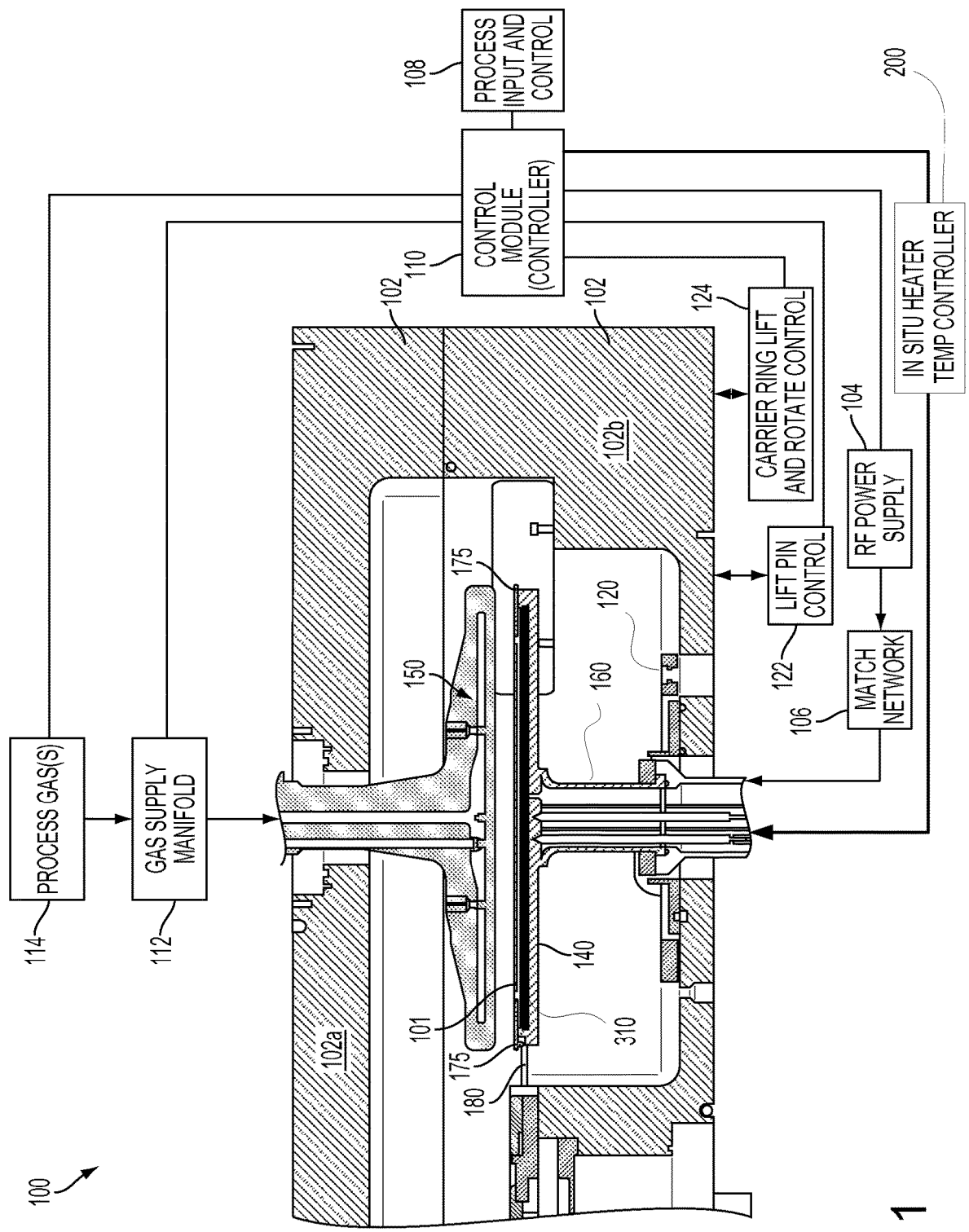
FIG. 1 illustrates a substrate processing system, which is used to process a wafer, e.g., to form films thereon, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that determine an approximate temperature of a corresponding heater zone of an electrostatic chuck (ESC) through resistance measurement of a corresponding heater trace used for heating the heater zone and a correlation function that uses a temperature coefficient of resistance of the heater trace. Because embodiments of the present disclosure do not require a dedicated temperature probe and/or sensor be inserted into cutouts of a layer of the ESC that would otherwise be dedicated to sensor placement, the ESC itself can be thinner than traditional ESCs.

Also, embodiments of the present disclosure provide for radio frequency (RF) uniformity improvement over the surface of the ESC, as there are no cutouts, holes, etc. in the ESC ceramic for direct temperature sensing as required in traditional ESCs configured for temperature measurement.

In addition, the ESC heating control systems of embodiments of the present disclosure can be made more economically and with significant cost savings over previous systems as there is no direct temperature sensor component requirement (i.e., no fiber-optic sensors, bandgap sensors, etc.) embedded in the ESC.

Further, because the ESC heating systems of embodiments of the present disclosure do not require use of temperature sensors as in previous heating systems, they can operate at high temperatures (e.g., operating ranges above 150 degrees Celsius) without any consideration of the heating limitations of those temperature sensors (e.g., bandgap sensors can operate up to 150 degrees Celsius) used for direct sensing of heater zones of the ESC as in previous systems.

Further, because embodiments of the present disclosure provide for more accurate temperature measurements, in situ (e.g., within the RF hot boundary) closed-loop control of the heating traces is possible, in comparison to previous heating control systems that provide for open-loop control of the temperature of the heater zone outside of the RF hot boundary because of less accurate temperature measurements.

In addition, because there is no requirement on the thickness of the heater trace used for heating a heater zone of the ESC when measuring voltage and current for purposes of determining temperature, heater traces can be made arbitrarily thin and still be configured for measurement of voltage and current to determine temperature of the heater trace and approximate temperature of the heater zone in embodiments of the present disclosure.

Further, embodiments of the present disclosure can provide advanced process control when applying heat to a plurality of heater zones of an ESC because the heater traces can be made arbitrarily thin with closed-loop control of those heater traces, thereby enabling a greater number of heater zones to be configured within the ESC (e.g., individually controlled vertical heater traces distributed throughout an ESC), in comparison to traditional heater systems that had limited numbers of heater zones because of the space temperature sensors required, and because of the low resolution of temperature association between a heater trace and a corresponding heater zone due to the low thermal conductivity of the ceramic of the ESC.

In addition, embodiments of the present disclosure are configured to provide more accurate measurements of temperature of a heater zone because measuring the resistance of the heater trace within the heater zone instead of sensing the temperature of the ceramic of the heater zone reduces the effect of temperature cross-talk or leakages between zones has on the measurement as experienced by traditional temperature sensing systems.

Embodiments of the present disclosure relate to plasma process modules, such as those used in plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, a plasma enhanced chemical vapor deposition (PECVD) chamber or module, an atomic layer etch (ALE) chamber or module, an ion implantation chamber or module, a track chamber or module, and any other semiconductor processing systems that may be associated or used in the fabrication and/or manufacturing of semiconductor wafers to include processes such as electroplating, electroetching, electropolishing, electro chemical mechanical polishing, deposition, wet deposition, and through silicon via (TSV) processes. Further, embodiments of the present disclosure are not limited to the examples provided herein, and may be practiced in different plasma processing systems employing different configurations, geometries, and plasma-generating technologies (e.g., inductively coupled systems, capacitively coupled systems, electron-cyclotron resonance systems, microwave systems, etc.). Examples of plasma processing systems and plasma process modules are disclosed in commonly owned U.S. Pat. Nos. 8,862,855, and 8,847,495, and 8,485,128, and U.S. patent application Ser. No. 15/369,110, all of which are incorporated by reference in their entireties. Importantly, the plasma process modules of embodiments of the present disclosure include an electrostatic chuck configured for supporting a substrate, wherein the approximate temperature of a corresponding heater zone in the ESC can be determined through resistance measurement of a corresponding heater trace used for heating the heater zone and a correlation function of the heater trace using a temperature coefficient of resistance of the heater trace. The determination of temperature of heater zones through resistance measurement of corresponding heater traces and corresponding correlation functions may be applied to heating assemblies other than those configured for supporting a substrate. For example, in other embodiments, heating assemblies may include a showerhead, an ESC, a support chuck, a pedestal, chamber components, or other structures or components that may be implemented in reactors, chambers, process modules, etc. used for processing substrates.

Throughout the specification, the term "substrate" as used herein refers to a semiconductor wafer in embodiments of the present disclosure. However, it should be understood that in other embodiments, the term substrate can refer to substrates formed of sapphire, GaN, GaAs or SiC, or other substrate materials, and can include glass panels/substrates, metal foils, metal sheets, polymer materials, or the like. Also, in various embodiments, the substrate as referred to herein may vary in form, shape, and/or size. For example, in some embodiments, the substrate as referred to herein may correspond to a 200 mm (millimeters) semiconductor wafer, a 300 mm semiconductor wafer, or a 450 mm semiconductor wafer. Also, in some embodiments, the substrate as referred to herein may correspond to a non-circular substrate, such as a rectangular substrate for a flat panel display, or the like, and may include other shapes.

With the above general understanding of the various embodiments, example details of the embodiments will now be described with reference to the various drawings. Similarly numbered elements and/or components in one or more figures are intended to generally have the same configuration and/or functionality. Further, figures may not be drawn to scale but are intended to illustrate and emphasize novel concepts. It will be apparent, that the present embodiments may be practiced without some or all of these specific details. In other instances, well-known process operations have not been described in detail in order not to unnecessarily obscure the present embodiments.

FIG. 1 illustrates a reactor system 100, which may be used to deposit films over substrates, such as those formed in atomic layer deposition (ALD) processes. These reactors may utilize one or more heaters, and the common terminal configurations may be used in this example reactor to control the temperatures for uniformity or custom settings. More particularly, FIG. 1 illustrates a substrate processing system 100, which is used to process a wafer 101. The system includes a chamber 102 having a lower chamber portion 102b and an upper chamber portion 102a. A center column 160 is configured to support a pedestal 140, which in one embodiment is a powered electrode. The pedestal 140 is electrically coupled to RF power supply 104 via a match network 106. The RF power supply 104 is controlled by a control module 110, e.g., a controller. The control module 110 is configured to operate the substrate processing system 100 by executing process input and control 108. The process input and control 108 may include process recipes, such as power levels, timing parameters, process gasses, mechanical movement of the wafer 101, etc., such as to deposit or form films over the wafer 101.

The pedestal 140 includes an electrostatic chuck (ESC) 310 that is configured to hold a substrate 101 while being exposed to a plasma processing environment in which plasma is generated. Embodiments of the present disclosure provide for determination and or measurement of one or more heater zones of the ESC 310 during plasma processing operations within the reactor system 100. In particular, the approximate temperature of a corresponding heater zone is determined through resistance measurement of a corresponding heater trace used for heating the heater zone, and a correlation function of the heater trace using a temperature coefficient of resistance of the heater trace.

The center column 160 also includes lift pins (not shown), each of which is actuated by a corresponding lift pin actuation ring 120 as controlled by lift pin control 122. The lift pins are used to raise the wafer 101 from the pedestal 140 to allow an end-effector to pick the wafer 101 and to lower the wafer 101 after being placed by the end-effector. The substrate processing system 100 further includes a gas supply manifold 112 that is connected to process gases 114, e.g., gas chemistry supplies from a facility. Depending on the processing being performed, the control module 110 controls the delivery of process gases 114 via the gas supply manifold 112, the chamber pressure, the generation of RF power from one or more RF power sources, the exhaust pump, etc. The chosen gases are then flown into the shower head 150 and distributed in a space volume defined between the showerhead 150 face that faces that wafer 101 and the wafer 101 resting over the pedestal 140. In ALD processes, the gases can be reactants chosen for absorption or reaction with absorbed reactants.

Further, the gases may be premixed or not. Appropriate valving and mass flow control mechanisms may be employed to ensure that the correct gases are delivered during the deposition and plasma treatment phases of the process. Process gases exit chamber via an outlet. A vacuum pump (e.g., a one or two stage mechanical dry pump and/or a turbomolecular pump) draws process gases out and maintains a suitably low pressure within the reactor by a close loop controlled flow restriction device, such as a throttle valve or a pendulum valve.

Also shown is a carrier ring 175 that encircles an outer region of the pedestal 140. The carrier ring 175 is configured to sit over a carrier ring support region that is a step down from a wafer support region in the center of the pedestal 140. The carrier ring 175 includes an outer edge side of its disk structure, e.g., outer radius, and a wafer edge side of its disk structure, e.g., inner radius, that is closest to where the wafer 101 sits. The wafer edge side of the carrier ring 175 includes a plurality of contact support structures which are configured to lift the wafer 101 when the carrier ring 175 is lifted by spider forks 180. The carrier ring 175 is therefore lifted along with the wafer 101 and can be rotated to another station, e.g., in a multi-station system. In other embodiments, the chamber is a single station chamber.

Further, an in situ heater temperature controller 200 is configured to control the temperature of one or more heater zones of the ESC 310 of the pedestal 140. The heater zones are used to enable precision control of the surface temperature of the ESC 310 during processing of a substrate. Multiple heater zones that are controllable provide the ability to tune a temperature profile of the ESC 310 (e.g., radial profile, etc.) to compensate for varying environmental conditions (e.g., thermal loss conditions, heat transfer conditions that vary between different process steps, etc.). In one embodiment, the in situ heater temperature controller 200 may operate independently in a closed-loop configuration with heater traces of corresponding heater zones. In another embodiment, the in situ heater temperature controller 200 may operate in conjunction with controller 110 in a closed-loop configuration with heater traces of corresponding heater zones. In embodiments, in situ temperature controller 200 is located inside chamber 102. In other embodiments, there may be multiple temperature controllers located both inside and outside of chamber 102, as described below.

Figure 2:
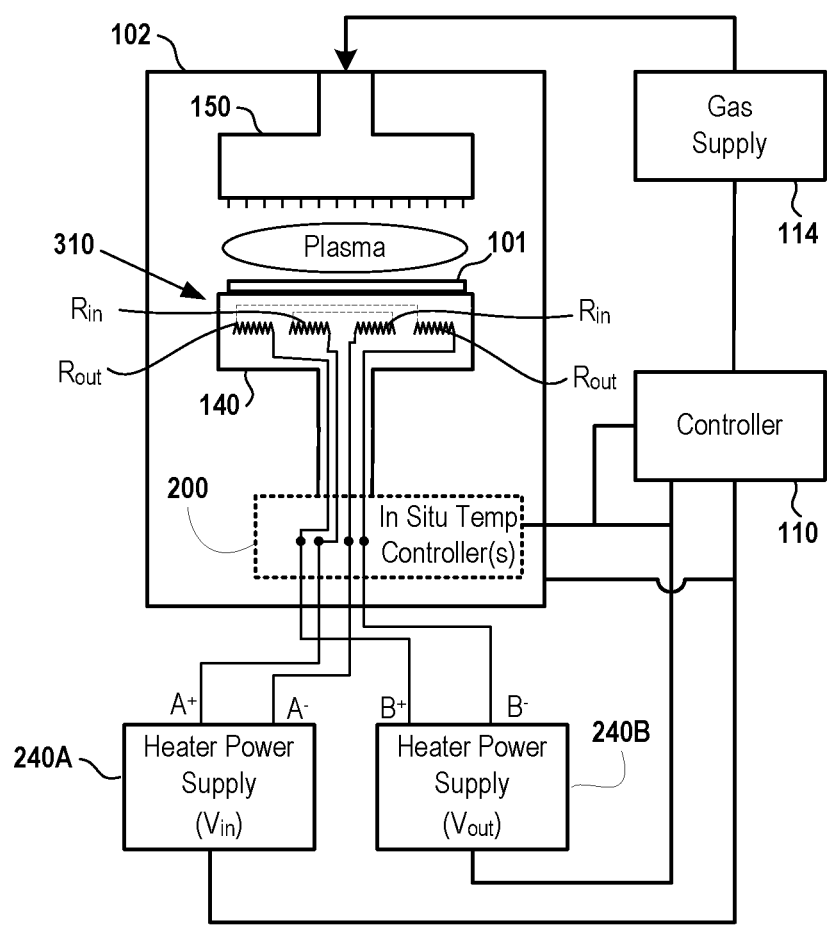
FIG. 2 illustrates a system diagram of a reactor utilized for processing a semiconductor substrate, the reactor including an electrostatic chuck having one or more heater zones heated by one or more heater traces, each of which is configured for temperature sensing, wherein the heater traces are controlled by one or more in situ temperature controllers, in accordance with one embodiment of the present disclosure.

FIG. 2 illustrates a system diagram of the reactor system 100 utilized for processing a semiconductor substrate, the reactor system including a chamber 102 including a pedestal 140 having an ESC 310, wherein the ESC 310 includes one or more heater zones heated by one or more heater traces, each of which is configured for temperature sensing, wherein the heater traces are controlled by one or more in situ temperature controllers, in accordance with one embodiment of the present disclosure. A semiconductor substrate 101 is shown disposed over pedestal 140. A showerhead 150 is used to supply process gases utilized to create and generate a plasma in chamber 102. Gas supply 114 supplies one or more gases depending on the process recipe being performed. Controller 110 is used to provide instructions to the various components of the reactor system 100, including facilities as gas supply 114, pressure controls, temperature controls, and other processing parameters.

In addition, the ESC 310 of the pedestal 140 may be configured with one or more heater zones, wherein the heater zones are controllably heated during processing by one or more in situ temperature controller(s) 200, in one embodiment. For example, one or more in situ temperature controller(s) 200 is configured to control the temperature of one or more heater zones of ESC 310. In situ temperature controller(s) 200 is located within an RF hot boundary, such that by being located within the chamber 102 each of the in situ temperature controller(s) 200 is exposed to process conditions (e.g., increased temperatures, pressures, etc.). In embodiments, the one or more heater zones of ESC 310 may be controlled by one or more in situ temperature controllers and/or the controller 110. That is, each of the heater zones may be controlled (1) independently by one or more in situ temperature controller(s) 200, (2) individually by the controller 110 (i.e., located outside of the RF hot boundary), or (3) by a combination of the in situ temperature controller(s) 200 and/or the controller 110. Having multiple temperature controllers capable of controlling the temperature of one or more heater zones may be beneficial for various reasons including, but not limited to, providing backups in case of controller failure, having accuracy control by locating the temperature controllers in one or more locations, being more efficient by assigning different controllers to different heater zones, etc.

Purely for illustration, ESC 310 may be configured with two heater zones, an inner heater zone heated by a heater trace R-in (e.g., resistive element), and an outer heater zone heated by a heater trace R-out (e.g., a resistive element). Heater power supply 240A is configured to supply power to the inner heater zone disposed in the ESC 310. Heater power supply 240B is configured to supply power to the outer heater zone disposed in the ESC 310. In embodiments, the in situ temperature controller(s) 200, the controller 110, or a combination thereof is coupled to heater power supply 240A and heater power supply 240B for controlling power supplied to the heater trace R-in and heater trace R-out, thereby controlling the temperature within the inner and outer heater zones. For example, in one embodiment, the in situ temperature controller(s) 200 may be coupled in a closed-loop configuration to heater power supply 240A and heater power supply 240B for controlling the temperature within the inner and outer heater zones. In another embodiment, the controller 110 may be coupled in a closed-loop configuration to heater power supply 240A and heater power supply 240B for controlling the temperature within the inner and outer heater zones. In still another embodiment, the in situ temperature controller(s) 200 and/or the controller 110 are coupled in a closed-loop configuration to heater power supply 240A and heater power supply 240B for controlling the temperature within the inner and outer heater zones. For purposes of clarity and brevity, various embodiments in the specification are described having the one or more heater zones of ESC 310 being controlled by in situ temperature controller(s) 200A, but is understood that the heater zones may be controlled by in situ temperature controller(s) 200A, and/or controller 110, taken alone or in various combinations, in other embodiments.

In particular, the functionality of the in situ controller 200 provides for resistance measurement of a corresponding heater trace used for heating a corresponding heater zone, wherein the resistance measurement is determined through one or more voltage measurements and a current measurement. In turn, an approximate temperature of a corresponding heater zone is determined using the resistance measurement and a correlation function of the heater trace, wherein the correlation function uses a temperature coefficient of resistance of the heater trace. In a closed-loop configuration, the determined approximate temperature of the heater zone may be used to determine the power to be supplied to the corresponding heater zone. For example, if the approximate temperature of a corresponding heater zone is lower than a desired temperature, then more power may be applied to the heater trace to increase the temperature for that heater zone. On the other hand, if the approximate temperature of the corresponding heater zone is higher than a desired temperature, then less power may be applied to the heater trace to decrease the temperature for that heater zone. In particular, the heater power supply 240A may be coupled to the inner heater zone, and heater power supply 240B may be separately coupled to the outer heater zone. In general, heater power supply 240A is capable of supplying a voltage V-in to the heater trace R-in to influence a change in temperature in the inner heater zone. Similarly, heater power supply 240B is capable of supplying a voltage V-out to the heater trace R-out to influence a change in temperature of the outer heater zone.

Figure 3A:
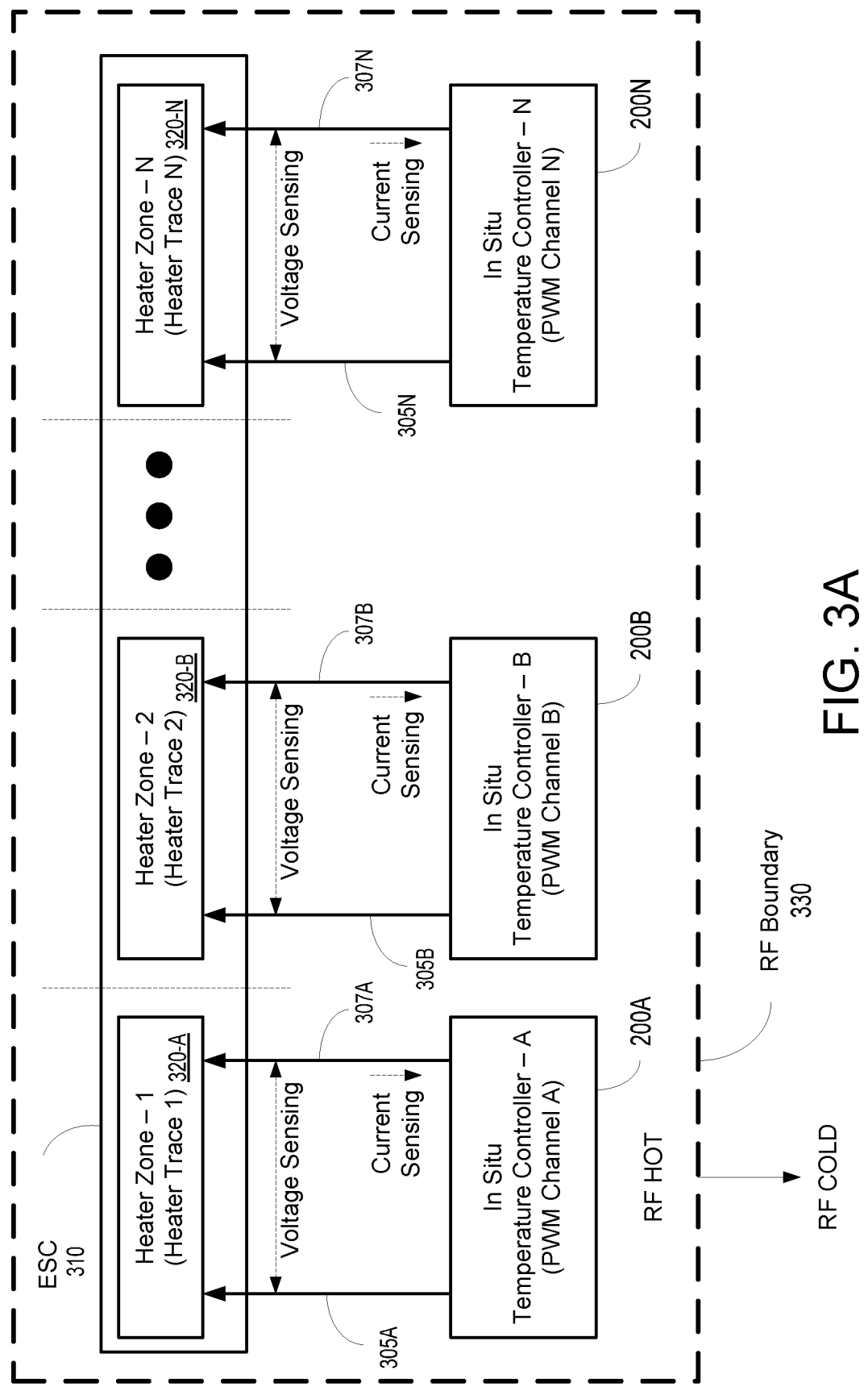
FIG. 3A illustrates a vertical cross-section view of an exemplary substrate holder configured as an electrostatic chuck that includes one or more heater zones heated by one or more heater traces, each of which is configured for temperature sensing, in accordance with one embodiment of the present disclosure.

FIG. 3A illustrates a vertical cross-section view of an exemplary substrate holder configured as an electrostatic chuck that includes one or more heater zones heated by one or more heater traces, each of which is configured for temperature sensing, in accordance with one embodiment of the present disclosure. In particular, the substrate holder may be an ESC 310 or other type of substrate support member. For purposes of brevity and clarity, the substrate holder is described in the specification as an electrostatic chuck.

The ESC 310 may be a topmost layer of the pedestal 140. Also, the ESC 310 may include a base plate, a bond layer disposed over the base plate, and a ceramic layer disposed over the bond layer, wherein the bond layer secures the ceramic layer to the base plate. For purposes of brevity and clarity, the baseplate, the bond layer and the ceramic layer are not shown. The ceramic layer may include one or more layers. A top surface of the ESC 310 may include an area configured to support the substrate 101 during processing.

ESC 310 may include one or more clamp electrodes (not shown) coupled to a clamp voltage power supply (not shown) for purposes of clamping a supported substrate to the ESC 310. In some embodiments, a single electrode may be configured to generate an electrical field for holding the substrate 101 on the ceramic layer. In other embodiments, two or more clamp electrodes may be configured to create a differential voltage between the electrodes which then generates an electrical field for holding the substrate 101 on the ceramic layer.

As shown, ESC 310 includes one or more heater zones. For example, ESC 310 may include a plurality of heater zones, such as, heater zone 1 (320-A), heater zone 2 (320-B), on up to heater zone N (320-N), wherein each of the heater zones may be individually controlled (e.g., one heater zone may be controlled independently of another heater zone). In one embodiment, the heater zones are located in the same horizontal plane. In another embodiment, the heater zones may be located in different horizontal planes, such that a first heater zone and a second heater zone may be located in different horizontal planes. Each of the heater zones may include a heater trace (e.g., resistive element) electrically coupled to a controller for controlling the power supplied to the corresponding heater trace (e.g., power supplied through a corresponding heater power supply—not shown). Each of the heater traces may be integrated in or embedded within a corresponding heater zone, and is configured to provide heat to the corresponding heater zone. For example, the heater traces may be fabricated and formed inside the ceramic layer of the ESC 310, such that the heater traces are disposed inside of the ceramic layer. As such, heat generated by the heater traces may be transferred to the ceramic layer. Each heater trace has an input end and an output end. Each heater trace may be controlled by a corresponding in situ temperature controller 200. For example, a corresponding in situ temperature controller 200 may be coupled between an input end of a corresponding heater trace, and an output end of the heater trace. As previously described, the controller may be an in situ temperature controller 200, a controller 110, or a combination thereof. For example, heater zone 1 is coupled to in situ temperature controller A (200A) via input line 305A (e.g., coupled to input end of heater trace 1) and output line 307A (e.g., coupled to output end of heater trace 1). That is, in situ temperature controller A (200A) is coupled between an input end and an output end of heater trace 1 of heater zone 1 (320-A). Also, in situ temperature controller B (200B) is coupled between an input end (e.g., through input line 305B) and an output end of heater trace 2 (e.g., through output line 307B) of heater zone 2 (320-B). Other heater traces are similarly controlled, to include in situ temperature controller N (200N) being coupled between an input end (e.g., through input line 305N) and an output end (e.g., through output line 307N) of heater trace N of heater zone N (320-N). In embodiments, one or more in situ temperature controllers 200 may be used to control one or more heater zones, such that each heater zone may be controlled by a corresponding in situ temperature controller 200 in a one-to-one relationship, or there could be fewer in situ temperature controllers 200 than the number of heater zones to handle the processing, or there could be one in situ temperature controller 200 to handle the processing.

Each in situ temperature controller 200 is configured to sense a voltage difference and current across a corresponding heater trace to determine a measured resistance of the heater trace. The measured resistance may be used to determine an approximate temperature of the corresponding heater zone heated by the heater trace using a correlation function. The correlation function models the relationship between temperature and resistance based on a temperature coefficient of resistance for the heater trace. In that manner, once the resistance and the corresponding temperature coefficient of resistance for the heater trace are known, the approximate temperature of the corresponding heater zone can be determined. For example, the in situ temperature controller A (200A) is configured to sense the voltage at the input end of heater trace 1 of heater zone 1 (320-A), and the voltage at the output end heater trace 1, thereby measuring or calculating a voltage difference across the heater trace 1. In addition, the in situ temperature controller A (200A) is configured to sense the current going through the heater trace 1. The current should be consistent across the heater trace 1, and can be measured at one or more locations, such as over line 307A. A resistance measurement can be determined through the sensed voltage difference and the sensed current. The resistance measurement is then used to determine the approximate temperature of the corresponding heater zone using the corresponding correlation function, as previously described.

Hence, the approximate temperature of the heater zone can be determined without using a temperature sensor embedded within the ESC 310. In particular, a corresponding in situ temperature controller 200 is configured to determine the approximate temperature of the corresponding heater zone without using temperature sensors embedded within the ESC 310. The in situ temperature controller is configured to probe and/or connect to the circuit providing current to generate heat within a heater zone of ESC 310 including the corresponding heater trace in order to sense voltages and/or current across the heater trace. The probe and/or connections may be made outside of the ceramic layer (e.g., using leads, connecting to the circuit, etc.) and within the RF hot environment. In other embodiments, current sensing, voltage sensing, resistance measurement and/or determination, and temperature measurement and/or determination may be programmed algorithmically into the in situ temperature controller 200.

In one embodiment, the in situ temperature controllers (e.g., 200A, 200B . . . 200N) are located within an RF boundary 330, such that the controllers are located in the RF hot environment of chamber 102, such as being exposed to process conditions of the chamber 102. In that manner, embodiments of the present disclosure provide for in situ resistance measurement within the RF hot environment, and further provide in situ control of the power supplied to corresponding heater traces. The in situ temperature controllers 200 may be mounted on an ESC control board, which is configured to drive the heater zones and to provide communications with a user interface (e.g., through fiber-optic cabling to reduce RF feedback) that is located outside the RF boundary (e.g., RF cold environment). That is, the in situ temperature controllers 200 may be configured to control power supplied to corresponding heater traces used to heat corresponding heater zones. In one embodiment, the power is supplied using pulse width modulation (PWM). The control board, through each of the in situ temperature controllers 200, is configured to measure voltages and current across each of the heater traces of corresponding heater zones, and calculate the approximate temperatures of corresponding heater zones of the ESC 310, as previously described.

Figure 3B:
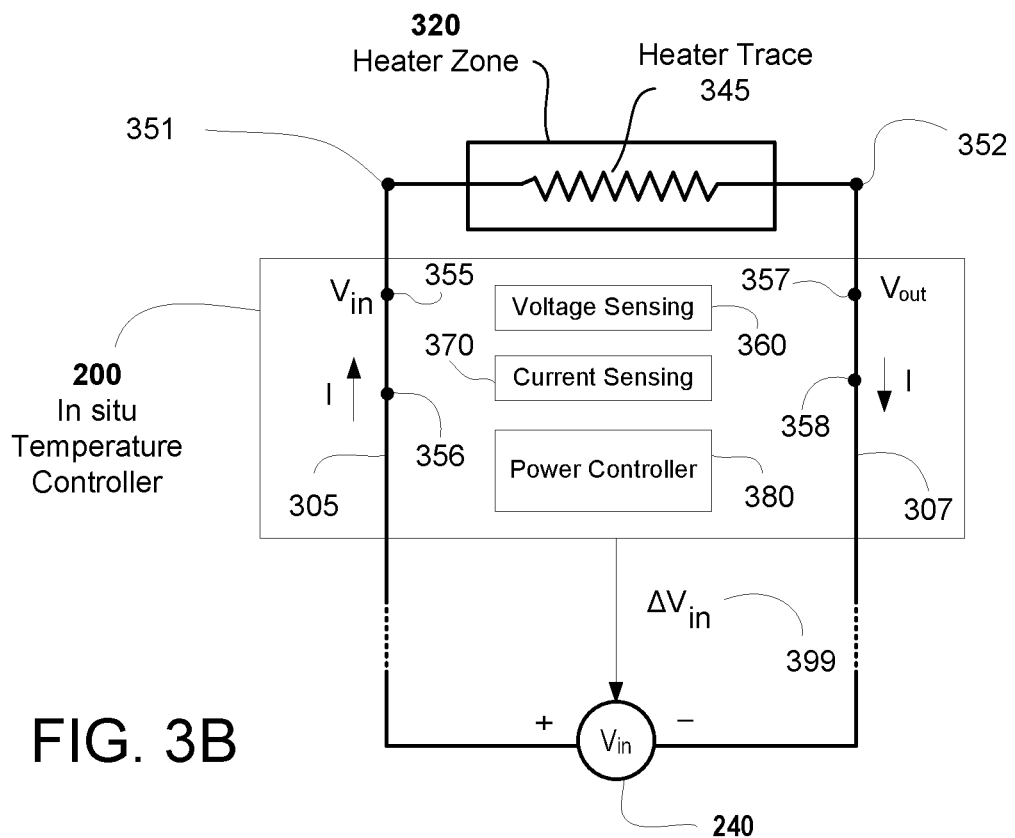
FIG. 3B illustrates a heating system configured for providing heat to a particular heater zone of an electrostatic chuck of FIG. 3A, wherein a temperature controller controls temperature of the heater zone as measured through a corresponding heater trace which is also configured for providing heat, in accordance with one embodiment of the present disclosure.

FIG. 3B illustrates a heating system configured for providing heat to a particular heater zone of an electrostatic chuck 310 of FIG. 3A, wherein an in situ temperature controller 200 controls temperature of the heater zone 320 as measured through a corresponding heater trace 345 configured for providing heat to the heater zone 320, in accordance with one embodiment of the present disclosure. In particular, heater trace 345 includes an input end 351 and an output end 352, wherein the heater trace 345 is coupled to a power supply 240. For example, the power supply 240 supplies power to the input end 351 over line 305. The power supply 240 is coupled to the output end 352 over line 307. In addition, in situ temperature controller 200 is coupled between the input end 351 and the output end 352 of the heater trace, in one embodiment. For example, in situ temperature controller 200 may be coupled to lines 305 and 307 for voltage and/or current sensing. Also, the in situ temperature controller 200 is coupled to the power supply 240 for delivering control signals. For example, the heater trace 345, in situ temperature controller 200, and power supply 240 may be coupled in a closed-loop, such that the in situ temperature controller 200 may be configured to control the power being supplied to the heater trace 345 based on the calculated temperature of the heater zone 320 and a desired temperature of the heater zone 320.

In particular, in situ temperature controller 200 is configured for in situ resistance measurement of the heater trace 345 in order to determine an approximate temperature of the corresponding heater zone 320 of the ESC 310. In one embodiment, the approximate temperature is determined without using a temperature sensor embedded or located in the corresponding heater zone. Embodiments of the present disclosure provide for measurement of voltage, current, and/or resistance to determine the approximate temperature at high operating temperatures (e.g., over 150 degrees Celsius) at a much lower cost than existing temperature sensing systems. In addition, temperature sensing systems of embodiments of the present disclosure provide for improved RF uniformity over the ESC footprint due to the absence of temperature sensing cutouts and connecting wires in at least one layer of the ESC.

The in situ temperature controller 200 is configured to perform voltage sensing 360 by measuring the voltage across the heater trace 345. For example, in situ temperature controller 200 may be coupled to input end 351 of heater trace 345 to measure an input voltage (V-in) to the heater trace 345, in one embodiment. In situ temperature controller 200 may be coupled to node 355 which simulates the input end 351 of the heater trace. In addition, in situ temperature controller 200 may be coupled to output end 352 of heater trace 345 to measure an output voltage (V-out) of the heater trace. In situ temperature controller 200 may be coupled to node 357 which simulates the output end 352. The in situ temperature controller 200 may be configured to determine the voltage difference between the input voltage and the output voltage.

In addition, the in situ temperature controller 200 is configured for current sensing 370 by measuring current through the heater trace 345. For example, in situ temperature controller 200 may be coupled to any of nodes 356 or 355 of input line 305 to measure the current I, which also runs through the heater trace 345. Also, in situ temperature controller 200 may be coupled to any of the nodes 357 or 358 of output line 307 to measure the same current I, which also runs through the heater trace 345. As such, the in situ temperature controller 200 may be configured to measure and/or sense the voltage and current across the heater trace 345 to calculate an approximate temperature of heater zone 320 of the ESC 310, as further described below. In addition, the power controller 380 is configured to determine what power to supply to the heater trace 345 based on the determined approximate temperature of the heater zone 320 and possibly a desired temperature for the heater zone 320, as further described below. For example, the power controller 380 may deliver a particular voltage level for the power supply 240 to supply to the heater trace 345, or may deliver an incremental voltage to the power supply 240 for adjusting the voltage either in a negative direction or a positive direction. The heat produced by the heater trace 345 (as generated through the power supplied) is transferred to the corresponding heater zone in the ESC.

Figure 3C:
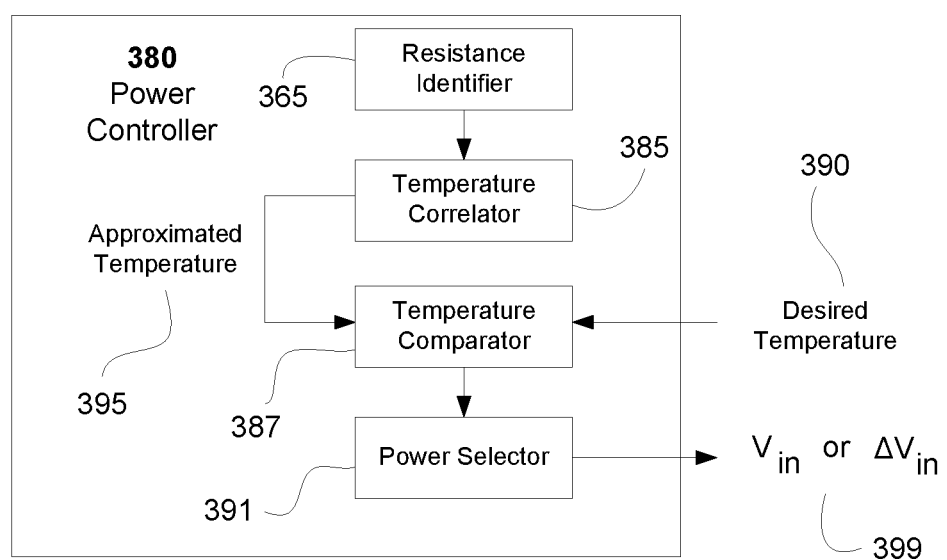
FIG. 3C illustrates the power controller of the temperature controller of FIG. 3B configured for controlling power supplied to the heater trace for purposes of controlling the temperature of the heater zone, in accordance with one embodiment of the present disclosure.

FIG. 3C illustrates the power controller 380 of the in situ temperature controller 200 of FIG. 3B that is configured for controlling power supplied to the heater trace 345 for purposes of controlling the temperature of the heater zone 320, in accordance with one embodiment of the present disclosure. As previously described, the in situ temperature controller 200 is configured to sense in real-time the voltage difference ($V_{htr}$) across the heater trace 345, and to sense in real-time the current ($I_{htr}$) through the heater trace 345.

In addition, the resistance identifier 365 of the power controller 380 is configured to identify a resistance of the heater trace 345 (e.g., in real-time) based on the sensed voltage difference and the sensed current. In particular, the resistance ($R_{htr}$) of heater trace 345 of the heater zone 320 can be calculated using the following equation:

$$R_{htr} = V_{htr}/I_{htr} \tag{1}$$

The approximate temperature 395 of the corresponding heater zone 320 of the ESC 310 may be obtained by the temperature correlator 385 through a correlation function based on the identified resistance ($R_{htr}$) and a temperature coefficient of resistance of the heater trace. In one embodiment, the correlation function is linear. In other embodiments, the correlation function is non-linear. The approximate temperature 395 of the corresponding heater zone 320 is determined without a temperature sensor embedded in or located in the heater zone 320 of the ESC 310, in one embodiment. As previously described, in one embodiment no sensor is provided in the ESC 310 for purposes of determining temperature of the corresponding heater zone. In particular, no temperature sensor, no voltage sensor, and no current sensor is provided within or embedded in the ESC 310 (e.g., in a cutout of a layer). Current and voltage sensing may be performed by an in situ temperature controller 200 outside of the ESC, and within the RF hot environment. For example, voltage and current may be sensed using probes, connections, etc. Also, voltage sensing, current sensing, resistance measurement and/or determination, temperature measurement and/or determination may be programmed algorithmically in the in situ temperature controller 200, in one embodiment.

In particular, the correlation function for a corresponding heater trace (e.g., trace 345) is based on several parameters including a calibrated resistance ($R_{htr@T0}$) of the heater trace 345 at a calibrated temperature (T0) of the heater trace 345, and a temperature coefficient of resistance $TCR_{htr}$ of the heater trace 345. In one embodiment, the calibrated measurements may be determined at a calibrated (predefined) temperature T0 (e.g., 20 degrees Celsius which is approximately room temperature). For example, the calibration may be performed at the factory during manufacturing. That is, at the known temperature T0, the resistance ($R_{htr@T0}$) can be measured and/or calibrated. In general, the temperature coefficient of resistance $TCR_{htr}$ defines a resistance change of a particular material per degree of temperature change. That is, as the temperature of a particular material changes, the associated resistance of that material will also change, as defined by its corresponding temperature coefficient of resistance. The temperature coefficient of resistance of the heater trace and/or the heater trace embedded within the ESC may be known (e.g., predefined) and/or calibrated, as described below.

In some embodiments, the heater trace 345 includes tungsten as the electrical conductor. In other embodiments, the heater trace 345 may include one or more of molybdenum, tantalum, tungsten, palladium, ruthenium, platinum, alloys, among others, for electrical conductivity. In one embodiment, the material used for the heater trace 345 has a minimum temperature coefficient of resistance of approximately $4.1 \times 10^{-3}$ (0.0041). In another embodiment, the material used for the heater trace 345 has a minimum temperature coefficient of resistance of approximately $4.4 \times 10^{-3}$ (0.0044).

Due to the known or calibrated characteristics of the material used for a particular heater trace (e.g., having a known temperature coefficient of resistance—$TCR_{htr}$), the approximate temperature 395 ($Temp_{zone}$) the corresponding heater zone, of the ESC (i.e., as heated by the heater trace) can be calculated based on the following equations:

$$R_{htr} = R_{htr@T0} * [1 + TCR_{htr} * (Temp_{zone} - T0)] \tag{2}$$

Because the resistance of the heater trace ($R_{htr}$) can be measured, and the remaining parameters (calibrated resistance at a calibrated temperature—$R_{htr@T0}$, and temperature coefficient of resistance—$TCR_{htr}$) are known as either being predefined and/or calibrated, the temperature of the heater trace ($Temp_{zone}$) can be determined, which can be approximated as the temperature 395 of the corresponding heater zone. The approximate temperature 395 of heater zone may be defined as the measured temperature of the heater zone. In particular, Equation 3 begins with Equation 2 and solves for the real-time approximate temperature 395 of the heater zone:

$$Temp_{zone} = (R_{htr}/R_{htr@T0} - 1)/TCR_{htr} + T0 \tag{3}$$

In one embodiment, the correlation function is linear, wherein the correlation function correlates resistance of the heater trace and temperature of the heater trace and/or the approximate temperature of the corresponding heater zone as heated by the heater trace. That is, the $TCR_{htr}$ is constant over an appropriate temperature range, and as such, the correlation function would be linear over that temperature range, wherein the slope of the correlation function is the temperature coefficient of resistance—$TCR_{htr}$. In one embodiment, the $TCR_{htr}$ is calibrated for the material of the heater trace—taken alone. In that case, the temperature response of the heater zone is approximated to the temperature response of the heater trace used to heat the corresponding heater zone. A good approximation between the temperature responses of the heater zone and heater trace may be made when the temperature coefficient of resistance of the material of the heater trace is assumed to be linear.

In other embodiments, the correlation function is non-linear. That is, the $TCR_{htr}$ is not constant over an appropriate temperature range. The $TCR_{htr}$ may still define the slope of a curve defining the correlation function at a particular point. In one embodiment, the $TCR_{htr}$ is calibrated for the heater trace as embedded within the ESC. Calibration may be performed when the correlation function is linear or non-linear, but is especially useful when the correlation function is non-linear to obtain more accurate temperature calculations. In that case, the correlation function may be calibrated for the heater trace as embedded within the ESC across an appropriate temperature range. For example, measurements of temperature of the heater zone and resistance of the heater trace may be performed to determine a more accurate correlation function, wherein the correlation function defines the relationship between the calibrated resistances of the heater trace and the calibrated temperature response of the heater zone heated by the heater trace.

The approximate temperature 395 of the heater zone may be provided as an input to the temperature comparator 387 of the power controller 380. A desired temperature 390 of the heater zone (e.g., as predefined by a process recipe) may also be provided as input to the temperature comparator 387. The temperature comparator 387 may be configured to determine a difference between the approximate temperature 395 of the heater zone and the desired temperature 390. Further, the power selector 391 may be configured to analyze the difference and match the approximate temperature 395 of the heater zone and the desired temperature 390. For example, the power selector 391 may be configured to apply a predefined response to match the two values. As such, the power selector 391 provides as an output 399 a response to be applied at the power supply 240, which controls the power supplied to the heater trace 345 of the heater zone 320. The response may be determined through a closed-loop analysis. That is, the power selector 391 of the in situ temperature controller 200 performs a closed-loop analysis of the approximate temperature 395 of the heater zone 320 to control power supplied by the power source 240 to the heater trace 345 such that the approximate temperature 395 matches a desired temperature 390 for the heater zone (e.g., over a predefined period of time).

For example, the power selector 391 may provide as output 399 the voltage level (V-in) to be supplied by the power supply 240 to the heater trace 345. In another embodiment, the power selector 391 may perform an iterative process that changes the voltage level (V-in) supplied by the power supply 240 in response to the history of measured differences between the approximate temperature 395 of the heater zone and the desired temperature 390 in order to match the approximate temperature 395 of the heater zone and the desired temperature 390 over a predefined period of time.

The logical components of the in situ temperature controller 200 and the power controller 380 FIGS. 3B and 3C show exemplary configurations for performing respective functionalities (e.g., voltage sensing, current sensing, resistance identifier, temperature correlation, temperature comparator, power selection, power controlling, etc.). It is understood that the functionalities of the logical components described within the in situ temperature controller 200 and the power controller 380 may be logically organized in various and different configurations. For example, some functionalities of power controller 380 may be split out and provided within the in situ temperature controller 200, and vice versa.

Embodiments of the present disclosure provide for a multi-zone heating system used in an electrostatic chuck. For example, each zone may be heated using a corresponding resistive element. In one embodiment, a dual zone heating system includes circular heating zones, such as an inner heater zone having a heater trace R-in (e.g., resistive element) for heating, and an outer zone having a heater trace R-out (e.g., resistive element) for heating. It should be appreciated that the dual zone heating system is only one example, and various layout configurations can be supported. For example, a heating system having one or more heater zones can be provided, such as a three heater zone system including an inner zone, a middle zone, and an outer zone. The number of heater zones may vary between systems, to include as examples heater zones numbering between 1 to 5, or to include heater zones numbering between 5 to 10, or 5 to 15, or greater than 5 heater zones, or greater than 10 heater zones, or greater than 20 heater zones, or greater than 50 heater zones, or greater than 75 heater zones, or greater than 100 heater zones, or greater than 125 heater zones. In still other examples, heater zones may be grouped in layers, wherein one set of multiple heater zones is at one horizontal layer, and at least one other layer includes another set of multiple heater zones. In other embodiments, the heater zones can be oriented in various configurations, such as in pie shapes, circular oriented heating circles, a grid of individual resistive elements, zigzag resistive elements, single resistive element, etc. As an illustration of embodiments, some layout configurations may provide for continuous circular rings of resistive elements for the multiple zones. As previously mentioned, and the resistive elements and/or heater traces used for heating corresponding heater zones may be integrated into the ceramic that defines the pedestal, which then receives a substrate for processing thereon.

In one embodiment, a multi-zone heating system is provided in one layer of the ESC, wherein the zones are arranged in a grid across the ESC. Each of the elements in the grid is individually controllable to provide heat. For example, the grid may be configured as a 14 by 14 grid of heating elements, such as corresponding heater traces and/or resistive elements. The number of heater zones may be provided in a one-to-one relationship, such that there are 14 by 14 heater zones, in one embodiment. In another embodiment, some of the heating elements are provided for redundancy, such that there are less heater zones than the number of heating elements. For example, there may be a 12 by 12 heater zone configuration that is supported by a grid of 14 by 14 heater elements (e.g., heater traces, resistive elements, etc.). In other embodiments, the grid pattern of the heating elements may be symmetric, asymmetric, uniformly distributed across the grid pattern, non-uniformly distributed across the grid pattern, of various shapes fitting within the outline of the ESC, etc. The multi-zone heating system described may be provided in one layer of the ESC, and may be configured to provide for fine tuning of heat across the ESC.

In another embodiment, the heating system may be distributed across multiple layers of the ESC. For example, one layer may provide for fine tuning of the heat provided to the ESC. The fine tuning of heat may be provided through the grid pattern of heating elements described above (e.g., 12 by 12 grid of heating elements, 14 by 14 grid of heating elements, etc.) for a multi-zone heating system. The heating system may include another layer of one or more heating zones that are configured to provide coarse tuning of heat applied to the ESC. For example, one or more rings of heater zones may be provided across the ESC, such as a dual heater zone ESC (e.g., two heater zones), a tri heater zone ESC (e.g., three heater zones), or a quad heater zone ESC (e.g., four heater zones).

In one embodiment, embodiments of the present disclosure are not limited by low resolutions of temperature association between a heater trace and the measured temperature of the heater zone (e.g., through a temperature sensor) because of low thermal conductivity of the ceramic. In traditional temperature measurement and heating systems (e.g., using a direct temperature sensor), the thickness of the heater trace could not go below a threshold (e.g., 10 mm), as heater traces below that threshold could not be accurately measured given the low resolution temperature association described above. This also limited how many heater zones could be provided in traditional heating system that had accurate temperature sensing (e.g., using direct temperature sensors). On the other hand, embodiments of the present disclosure have high resolution of temperature association between a heater trace and the measured temperature of the heater zone because there is high resolution of the measurement of voltage and current with low noise. In that manner, embodiments of the present disclosure can provide heater traces with cross sections significantly below the 10 mm threshold, previously applied. In addition, embodiments of the present disclosure can provide width of a cross section (e.g., horizontal width of cross section) of the heater trace that is less than 10 mm, and of an arbitrary thickness. This is because of the high resolution of the measurement of voltage and current with low noise, which allows for accurate measurement of voltage and current no matter the thickness of the heater trace, and for more accurate measurements of the approximate temperature of the corresponding heater zone. In addition, embodiments of the present disclosure can provide advanced process control when applying heat to a plurality of heater zones of an ESC because the heater traces can be made arbitrarily thin with closed-loop control of those heater traces thereby enabling a greater number of heater zones configured within the ESC (e.g., individually controlled vertical heater traces distributed throughout an ESC)

FIG. 4 is a flow diagram 400 illustrating a method for controlling temperature of a heater zone of an electrostatic chuck using a corresponding heater trace integrated in the ESC and which is configured for temperature sensing and for providing heat to the heater zone, in accordance with one embodiment of the present disclosure. The method of flow diagram 400 may be applied by one or more of the plasma processing modules 100 of FIGS. 1 and 2, and the systems described in FIGS. 3A-3C.

At 410, the method includes supplying power from a power supply to a heater trace. The heater trace may be integrated in the heater zone of the ESC for the plasma processing chamber. The heater trace is configured to provide heat to the heater zone. The heater trace may have an input end and an output end coupled to the power supply, as previously described. Power supplied to the heater trace is controlled by a temperature controller, such as a temperature controller that is configured to provide in situ (e.g., within an RF hot environment) measurement of resistance of the heater trace and correlate that resistance to an approximate temperature of the corresponding heater zone.

At 420, the method includes sensing a voltage difference in real-time between the input end and the output end of the heater trace. In particular, the temperature controller is configured to sense the input voltage at the input end of the heater trace, and sense the output voltage at the output end of the heater trace, as previously described. In that manner, the voltage drop across the heater trace within the heater zone can be determined by the temperature controller. In one embodiment, the sensing of the voltage and the current is performed within the RF hot environment of the plasma processing chamber.

At 430 the method includes sensing a current in real-time in the heater trace. In particular, the temperature controller is configured for sensing the current through the heater trace, as previously described. Because the current should be equal throughout a circuit including the heater trace, the current can be sensed at any of multiple nodes within the circuit. For instance, the current may be sensed at either the input end or the output end of the heater trace, or at the locations where the voltage is sensed. Other locations may be used for sending the current. In one embodiment, the sensing of the current is performed within the RF hot environment of the plasma processing chamber.

At 440, the method includes identifying a resistance in real-time of the heater trace based on the sensed voltage difference and the sensed current. In particular, the temperature controller is configured to identify the resistance, as previously described. In one embodiment, the resistance is determined through the relationship of voltage (V), current (I), and resistance (R): $V=I*R$ of a circuit.

At 450, the method includes approximating a temperature of the heater zone based on the identified resistance and a correlation function of the heater trace. Specifically, the approximate temperature of the heater zone is determined without the use of a temperature sensor in the heater zone of the ESC (e.g., temperature sensor embedded in a layer of the ESC), as previously described, and in one embodiment. The correlation function uses a temperature coefficient of resistance of the heater trace. In embodiments, the correlation function may be linear or non-linear, as previously described.

Figure 5:
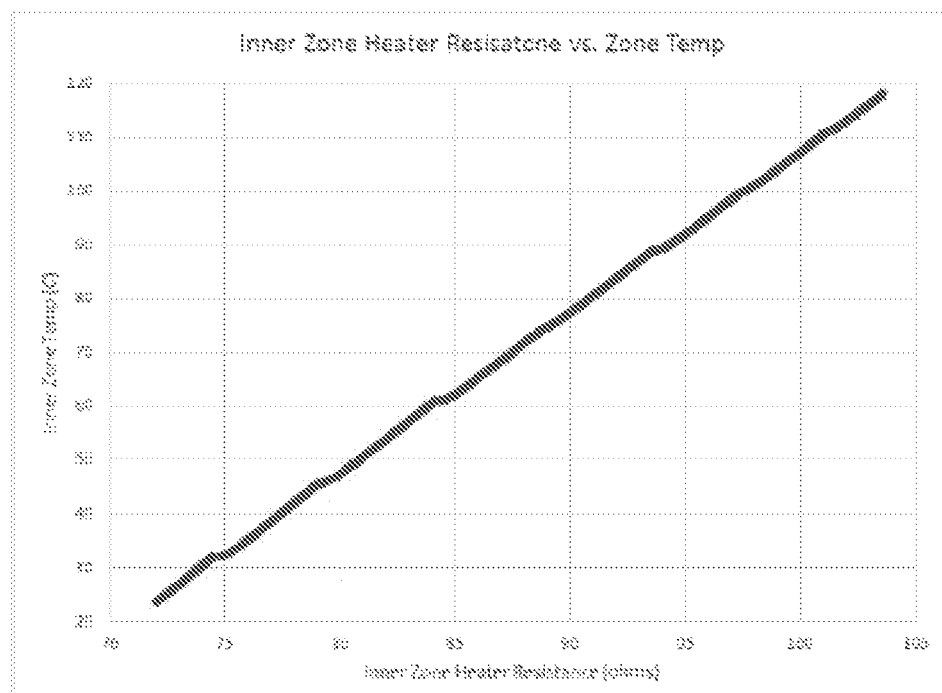
FIG. 5 is a diagram of a correlation function between resistance and temperature for a heater trace configured for providing heat to a heater zone of an electrostatic chuck, wherein the correlation function uses a temperature coefficient of resistance of the heater trace, in accordance with one embodiment of the present disclosure.

In some embodiments, the correlation function may be linear, wherein the temperature coefficient of resistance is constant over an appropriate range (e.g., range of operation). The correlation function is defined for a particular heater trace, and more particularly for the heater trace embedded within the ESC. FIG. 5 provides an illustration of a correlation function 500, wherein the correlation function defines the linear correlation and or relationship between resistance and temperature for a heater trace configured for providing heat to a heater zone of an electrostatic chuck. The correlation function 500 uses a temperature coefficient of resistance ($TCR_{htr}$) of the heater trace, wherein the slope of the correlation function is approximately the temperature coefficient of resistance of the heater trace ($TCR_{htr}$) and/or the heater trace embedded within the ESC. In one embodiment, the correlation function 500 is calibrated to the heater trace. For example, calibration may be performed at the factory during fabrication and/or manufacturing of the ESC. In particular, the temperature coefficient of resistance ($TCR_{htr}$) may be known for the given material. That is, the slope of the line in the correlation function 500 is known. Calibration provides an appropriate intersection point of the line for a given calibrated temperature (e.g., 20 degrees Celsius) and a calibrated resistance ($R_{htr@t0}$). In that manner, the correlation function may be defined for the particular heater trace and/or the heater trace embedded within the heater zone of the ESC.

In other embodiment, the correlation function may be non-linear. The correlation function may be calibrated for the heater trace by itself, or for the heater trace embedded within the ESC across an appropriate temperature range of operation. For example, measurements of the temperature of the heater zone and resistance of the heater trace may be performed to determine the non-linear correlation function, as previously described, wherein the correlation function defines the relationship between the calibrated resistances of the heater trace and the calibrated temperature response of the heater zone as heated by the heater trace.

In one embodiments, a closed-loop analysis of the approximate temperature of the heater zone and a desired temperature of the heater zone is performed by the temperature controller. In one embodiment, the closed-loop analysis is performed in situ to the RF hot environment. In that manner, the power supplied to the heater trace may be controlled using the closed-loop analysis, as previously described. For example, the temperature controller may iteratively change the power supplied to the heater trace to match the approximate temperature of the heater zone to the desired temperature over a period of time. In another embodiment, the temperature controller may provide a voltage input as defined by a predefined response to the measured approximate temperature of the heater zone. In one embodiment, the power supplied to the heater trace is controlled through pulse width modulation (PWM). In one embodiment, in situ power control is provided to the heater trace, wherein the closed-loop analysis is performed within an RF hot environment of the plasma processing chamber, as previously described.

In another embodiment, a user interface is configured to provide information to a user. The user interface may be provided within a display that is outside of a plasma processing chamber. Information may be provided in the user interface, wherein the information includes a first temperature of a first heater zone of an electrostatic chuck for a plasma processing chamber, the electrostatic chuck configured to support a substrate. The user interface may include an alert providing a recommendation including at least one action to be taken based on the information. In particular, the first temperature is determined by a first temperature controller that is configured to sense a voltage difference across a first heater trace (e.g., between an input end and an output end of the first heater trace) integrated in the first heater zone; to sense a current in the first heater trace; to identify a resistance of the first heater trace based on the voltage difference and the current that is sensed; and to approximate the first temperature based on the resistance and a correlation function of the first heater trace.

In some embodiments, the alert includes a difference between a desired temperature of the heater zone and the temperature, wherein the difference exceeds a threshold.

In other embodiments, the user interface includes a second temperature of a second heater zone of the electrostatic chuck. The second temperature is determined by a second temperature controller that is configured to sense a voltage difference across a second heater trace (e.g., between an input end and an output end of the second heater trace) integrated in the second heater zone; to sense a current in the second heater trace; to identify a resistance of the second heater trace based on the voltage difference and the current that is sensed within the second heater trace; and to approximate the second temperature based on the resistance and a correlation function of the second heater trace. In still another embodiment, the first heater zone the second heater zone are on different horizontal planes.

In one embodiment, the first temperature controller is configured to provide in situ control of the power supplied to the first heater trace, such that the first temperature controller is located within an RF hot environment of the plasma processing chamber. In particular, the first temperature controller performs a closed-loop analysis of the temperature that is approximated to control the power supplied to the first heater trace such that the first temperature that is approximated matches a desired temperature.

A1) In one embodiment, a plasma processing system for processing a substrate is disclosed. The plasma processing system includes a reactor including an electrostatic chuck (ESC) for supporting the substrate, the reactor being configured to receive process gases. The plasma processing system includes a heater zone of the ESC. The plasma processing system includes a heater trace integrated in the heater zone. The heater trace being configured to provide heat to the heater zone. The heater trace having an input end and an output end. And the plasma processing system includes a temperature controller configured to: sense a voltage difference across the heater trace and sense a current in the heater trace; identify a resistance of the heater trace based on the sensed voltage difference and the sensed current; and approximate a temperature of the heater zone based on the identified resistance and a correlation function of the heater trace. Wherein the correlation function uses a temperature coefficient of resistance of the heater trace.

A2) The plasma processing system of A1, wherein the correlation function is linear or non-linear.

A3) The plasma processing system of A1), wherein the temperature controller performs a closed-loop analysis of the approximate temperature of the heater zone to control power supplied to the heater trace such that the approximate temperature matches a desired temperature for the heater zone.

A4) The plasma processing system of A1), wherein the temperature controller is configured to provide in situ control of the power supplied to the heater trace, such that the temperature controller is located within an RF hot environment of the plasma processing chamber.

A5) The plasma processing system of A1), wherein the temperature controller approximates the temperature of the heater zone without using a temperature sensor in the heater zone.

B1) A plasma processing system for processing a substrate. The plasma processing system including a first heater zone of an electrostatic chuck (ESC) for a plasma processing chamber, wherein the ESC is configured to support a substrate during processing. The ESC includes a first heater trace integrated in the heater zone and configured to provide heat to the first heater zone, the first heater trace having a first input end and a first output end. The plasma processing system including a first temperature controller configured to sense a first voltage difference across the first heater trace and sense a first current in the first heater trace. The temperature controller configured to identify a first resistance of the first heater trace based on the sensed first voltage difference and the sensed first current. The temperature controller configured to approximate a first temperature of the first heater zone based on the identified first resistance and a first correlation function of the first heater trace, wherein the first correlation function uses a first temperature coefficient of resistance of the first heater trace.

B2) The plasma processing system of B1), wherein the first correlation function defines a linear correlation of temperature and resistance and has a slope that is about a temperature coefficient of resistance of the first heater trace.

B3) The plasma processing system of B1), wherein the first correlation function defines a non-linear correlation of temperature and resistance.

B4) The plasma processing system of B1), wherein the first correlation function is defined for the first heater trace integrated in the first heater zone of the ESC.

B5) The plasma processing system of B1), wherein the first temperature controller approximates the first temperature of the first heater zone without using a temperature sensor in the first heater zone.

B6) The plasma processing system of B1), wherein the first temperature controller performs a closed-loop analysis of the approximated first temperature of the first heater zone to control power supplied to the first heater trace such that the approximated first temperature matches a desired temperature for the first heater zone.

B7) The plasma processing system of B6), wherein the first temperature controller controls the power using pulse width modulation.

B8) The plasma processing system of B6), wherein the first temperature controller is configured to provide in situ control of the power supplied to the first heater trace, such that the first temperature controller is located within an RF hot environment of the plasma processing chamber.

B9) The plasma processing system of B1), including a second heater zone and a second heater trace integrated in the second heater zone of the ESC. The second heater trace configured to provide heat to the second heater zone, the second heater trace having a second input end and a second output end. The plasma processing system including a second temperature controller configured to sense a second voltage difference across the second heater trace and sense a second current in the second heater trace, to identify a second resistance of the second heater trace based on the sensed second voltage difference and the sensed second current, and to approximate a second temperature of the second heater zone based on the identified second resistance and a second correlation function of the second heater trace, wherein the second correlation function uses a second temperature coefficient of resistance of the second heater trace.

B10) The plasma processing system of B9), wherein the first heater zone and the second heater zone are on different horizontal planes.

B11) The plasma processing system of B1), wherein a horizontal width of a cross section of the first heater trace is less than 10 mm.

Figure 6:
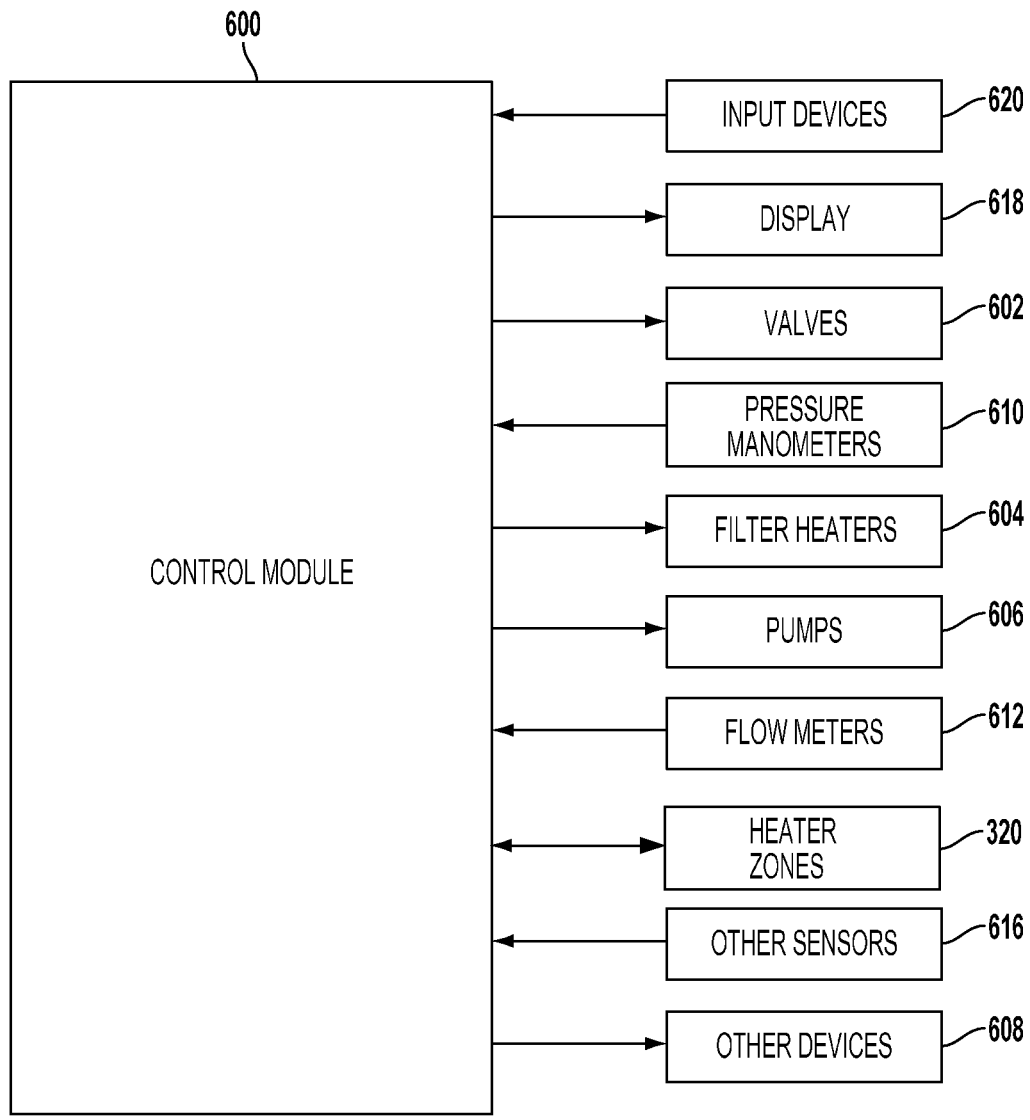
FIG. 6 shows a control module for controlling the systems described above, in accordance with one embodiment of the present disclosure.

FIG. 6 shows a control module 600 for controlling the systems described above. In one embodiment, the control modules 110 of FIG. 1 and/or 200 of FIG. 2 may include some of the example components of control module 600. For instance, the control module 600 may include a processor, memory and one or more interfaces. The control module 600 may be employed to control devices in the system based in part on sensed values. For example only, the control module 600 may control one or more of valves 602, filter heaters 604, pumps 606, zone heaters 320, and other devices 608 based on the sensed values and other control parameters. The control module 600 receives the sensed values from, for example only, pressure manometers 610, flow meters 612, and/or other sensors 616. The control module 600 may also be employed to control process conditions during precursor delivery and deposition of the film. The control module 600 will typically include one or more memory devices and one or more processors.

The control module 600 may control activities of the precursor delivery system and deposition apparatus. The control module 600 executes computer programs including sets of instructions for controlling process timing, delivery system temperature, and pressure differentials across the filters, valve positions, mixture of gases, chamber pressure, chamber temperature, substrate temperature, RF power levels, substrate chuck or pedestal position, and other parameters of a particular process. The control module 600 may also monitor the pressure differential and automatically switch vapor precursor delivery from one or more paths to one or more other paths. Other computer programs stored on memory devices associated with the control module 600 may be employed in some embodiments.

Control module 600 may be configured to sense voltage, sense current, determine resistance, determine temperature of a heater zone, and control the power delivered to the heater zones 320 based on the sensed voltage and current. In particular, the control module 600 may be configured to determine an approximate temperature of a corresponding heater zone in the ESC, wherein the approximate temperature can be determined through a resistance measurement (e.g., as determined through sensing voltage and current) of a corresponding heater trace used for heating the heater zone and a correlation function of the heater trace using a temperature coefficient of resistance of the heater trace. The control module 600 may be configured to analyze the approximate temperature against a desired temperature and prescribe a voltage to be applied to the heater trace in response.

Typically there will be a user interface associated with the control module 600. The user interface may include a display 618 (e.g., a display screen and/or graphical software displays of the apparatus and/or process conditions), and user input devices 620 such as pointing devices, keyboards, touch screens, microphones, etc.

Computer programs for controlling delivery of precursor, deposition and other processes in a process sequence can be written in any conventional computer readable programming language: for example, assembly language, C, C++, Pascal, Fortran or others. Compiled object code or script is executed by the processor to perform the tasks identified in the program.

The control module parameters relate to process conditions such as, for example, filter pressure differentials, process gas composition and flow rates, temperature, pressure, plasma conditions such as RF power levels and the low frequency RF frequency, cooling gas pressure, and chamber wall temperature.

The system software may be designed or configured in many different ways. For example, various chamber component subroutines or control objects may be written to control operation of the chamber components necessary to carry out the inventive deposition processes. Examples of programs or sections of programs for this purpose include substrate positioning code, process gas control code, pressure control code, heater control code, and plasma control code.

A substrate positioning program may include program code for controlling chamber components that are used to load the substrate onto a pedestal or chuck and to control the spacing between the substrate and other parts of the chamber such as a gas inlet and/or target. A process gas control program may include code for controlling gas composition and flow rates and optionally for flowing gas into the chamber prior to deposition in order to stabilize the pressure in the chamber. A filter monitoring program includes code comparing the measured differential(s) to predetermined value(s) and/or code for switching paths. A pressure control program may include code for controlling the pressure in the chamber by regulating, e.g., a throttle valve in the exhaust system of the chamber. A heater control program may include code for controlling the current to heating units for heating components in the precursor delivery system, the substrate and/or other portions of the system. Alternatively, the heater control program may control delivery of a heat transfer gas such as helium to the substrate chuck.

Examples of sensors that may be monitored during deposition include, but are not limited to, mass flow control modules, pressure sensors such as the pressure manometers 610, and thermocouples located in delivery system, the pedestal or chuck. Appropriately programmed feedback and control algorithms may be used with data from these sensors to maintain desired process conditions. The foregoing describes implementation of embodiments of the disclosure in a single or multi-chamber semiconductor processing tool.

In some implementations, a controller is part of a system, which may be part of the above-described examples. Such systems can comprise semiconductor processing equipment, including a processing tool or tools, chamber or chambers, a platform or platforms for processing, and/or specific processing components (a substrate pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, substrate transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor substrate or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with, coupled to the system, otherwise networked to the system, or a combination thereof. For example, the controller may be in the "cloud" of all or a part of a fab host computer system, which can allow for remote access of the substrate processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g., a server) can provide process recipes to a system over a network, which may include a local network or the Internet.

The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within their scope and equivalents of the claims.

What is claimed is:

1. A controller, comprising:
a voltage sensor coupled to a heater trace integrated in an electrostatic chuck, the voltage sensor configured to sense a voltage difference across the heater trace, wherein the heater trace is associated with a heater zone;
a current sensor coupled to the heater trace and configured to directly sense a current in the heater trace;
a resistance identifier configured to identify a resistance of the heater trace based on the voltage difference and the current in the heater trace that are sensed; and
a temperature correlator configured to approximate a temperature of the heater zone based on the resistance of the heater trace and a correlation function of the heater trace,
wherein the correlation function of the heater trace uses a temperature coefficient of resistance of the heater trace,
wherein the correlation function of the heater trace defines a non-linear correlation of temperature and resistance.

2. The controller of claim 1, further comprising:
a temperature comparator configured to compare the temperature of the heater zone that is approximated to a desired temperature associated with the heater zone.

3. The controller of claim 2, further comprising:
a power controller configured to adjust a power to the heater trace based on a comparison result between the temperature of the heater zone that is approximated and the desired temperature.

4. The controller of claim 3,
wherein the power controller adjusts the power to the heater trace using pulse width modulation.

5. The controller of claim 3,
wherein the voltage sensor and the current sensor and the power controller are located within an RF hot environment of a plasma processing chamber, wherein the power controller includes the resistance identifier and the temperature correlator and the temperature comparator, and
wherein the power controller is configured to provide in situ adjustment of the power to the heater trace.

6. The controller of claim 3,
wherein the power controller performs a closed-loop analysis of the temperature of the heater zone that is approximated to adjust the power to the heater trace such that the temperature of the heater zone that is approximated matches the desired temperature.

7. The controller of claim 1,
wherein the temperature correlator approximates the temperature of the heater zone without using a temperature sensor.

8. A user interface, comprising:
a display configured to show information related to a first heater zone of an electrostatic chuck for a plasma processing chamber;
wherein the information includes a first temperature associated with the first heater zone;
wherein the first temperature associated with the first heater zone is determined by a first temperature controller that is configured to:
  sense a voltage difference across a first heater trace associated with the first heater zone;
  sense a current in the first heater trace;
  identify a resistance of the first heater trace based on the voltage difference and the current in the first heater trace that is sensed; and
  approximate the first temperature associated with the first heater zone based on the resistance of the first heater trace and a correlation function of the first heater trace,
  wherein the correlation function of the first heater trace defines a non-linear correlation of temperature and resistance.

9. The user interface of claim 8, further comprising:
logic configured to trigger an alert based on the first temperature associated with the first heater zone that is approximated.

10. The user interface of claim 9,
wherein the alert includes a recommendation providing at least one action to be taken based on the information.

11. The user interface of claim 9,
wherein the alert is triggered when a difference between a desired temperature of the first heater zone and the first temperature associated with the first heater zone that is approximated exceeds a threshold.

12. The user interface of claim 8,
wherein the information includes a second temperature associated with a second heater zone of the electrostatic chuck.

13. The user interface of claim 12, wherein the second temperature associated with the second heater zone is determined by a second temperature controller that is configured to:
sense a voltage difference across a second heater trace associated with the second heater zone;
sense a current in the second heater trace;
identify a resistance of the second heater trace based on the voltage difference and the current in the second heater trace that is sensed; and
approximate the second temperature associated with the second heater zone based on the resistance of the second heater trace and a correlation function of the second heater trace.

14. The user interface of claim 12,
wherein the first heater zone and the second heater zone are on different horizontal planes.

15. The user interface of claim 8,
wherein the first temperature controller is further configured to compare the first temperature associated with the first heater zone that is approximated to a desired temperature associated with the first heater zone.

16. The user interface of claim 15,
wherein the first temperature controller is further configured to adjust a power to the first heater trace based on a comparison result between the first temperature associated with the first heater trace that is approximated and the desired temperature associated with the first heater zone.

17. The user interface of claim 16,
wherein the first temperature controller is located within an RF hot environment of the plasma processing chamber,
wherein the first temperature controller is configured to provide in situ adjustment of the power to the first heater trace.

18. The user interface of claim 15,
wherein the first temperature controller performs a closed-loop analysis of the first temperature associated with the first heater trace that is approximated to adjust a power to the first heater trace such that the first temperature associated with the first heater zone that is approximated matches the desired temperature associated with the first heater zone.

19. A method for controlling temperature of an electrostatic chuck (ESC) in a plasma processing chamber, the ESC having a heater zone with a heater trace integrated therein, the heater trace having an input end and an output end and configured to provide heat to the heater zone, comprising:
supplying a power to the heater trace;
sensing a voltage difference between the input end and the output end of the heater trace;
directly sensing a current in the heater trace;
identifying a resistance of the heater trace based on the voltage difference that is sensed and the current in the heater trace that is sensed; and
approximating a temperature of the heater zone based on the resistance of the heater trace that is identified and a correlation function of the heater trace without using a temperature sensor in the heater zone, wherein the correlation function of the heater trace uses a temperature coefficient of resistance of the heater trace,
wherein the correlation function of the heater trace defines a non-linear correlation of temperature and resistance.

20. The method of claim 19, further comprising:
comparing the temperature of the heater zone that is approximated to a desired temperature associated with the heater zone.

21. The method of claim 20, further comprising:
generating an alert when a comparison result between the temperature of the heater zone that is approximated and the desired temperature associated with the heater zone exceeds a threshold.

22. The method of claim 20, further comprising:
displaying a comparison result between the temperature of the heater zone that is approximated and the desired temperature associated with the heater zone.

23. The method of claim 20, further comprising:
adjusting the power supplied to the heater trace based on a comparison result between the temperature of the heater zone that is approximated and the desired temperature associated with the heater zone.

24. The method of claim 20, further comprising:
wherein the power supplied to the heater trace is adjusted such that the temperature of the heater zone that is approximated matches the desired temperature associated with the heater zone.

25. The method of claim 20, further comprising:
performing a closed-loop analysis of the temperature of the heater zone that is approximated and the desired temperature associated with the heater zone; and
adjusting the power supplied to the heater trace using pulse width modulation based on the closed-loop analysis.

26. The method of claim 25, further comprising:
providing in situ control of the power supplied to the heater trace by performing the closed-loop analysis within an RF hot environment of the plasma processing chamber.

27. The method of claim 20, wherein the correlation function of the heater trace is defined for the heater trace integrated in the heater zone.

\* \* \* \* \*